Patented Oct. 7, 1947

2,428,745

UNITED STATES PATENT OFFICE 2,428,745

ALKYLATION OF PHENOLS

Gordon H. Stillson, Oakmont, Pa., assignor to Gulf Research & Development Company, Pittsburgh, Pa., a corporation of Delaware No Drawing. Application January 3, 1944, Serial No. 516,866

8 Claims. (Cl. 260—624)

This invention relates to the alkylation of phenols and it is particularly concerned with an improved method for the alkylation of phenols with olefins in the presence of an acid catalyst.

The alkyl phenols, particularly the 2,4,6-trialkylated monohydroxy phenols having a total of four or more carbon atoms in the alkyl groups ortho to the hydroxyl group, which are substantially insoluble in dilute aqueous alkali solutions, are quite valuable antioxidants for the prevention of oxidational deterioration of various organic materials such as petroleum hydrocarbon products, and various methods for their production are known. Most of these methods are based on the treatment of phenol, or a simple alkyl phenol such as a cresol, xylenol or ethyl phenol with an olefin, usually an olefin containing three or more carbon atoms, in the presence of an acid or an acid-acting catalyst. Various difficulties have been encountered in these processes because of the fact that when a strong acid catalyst such as sulfuric acid or aluminum chloride is used undesirable side reactions take place, particularly polymerization of the olefin, and when relatively weak acid catalysts are used yields are low or too great a time is required to obtain a satisfactory yield. Also, in most of these processes the catalyst is used up or lost either by side reaction or by neutralization and washing.

It is an object achieved by this invention to provide a method for the alkylation of phenols with olefins in the presence of an acid catalyst, in which the alkyl phenol product obtained is of relatively high purity, and in which polymerization of the olefin and other side reactions and decompositions are minimized. Another object of this invention is to provide an improved catalyst for the alkylation of phenols with olefins adapted to be recovered in substantial part from the reaction products, in a form suitable for reuse as a catalyst for the alkylation of further quantities of phenols with olefins.

I have found that when the alkylation of a phenol with an olefin is carried out in the presence of tetraphosphoric acid as the catalyst, a number of advantages are obtained. The crude product obtained is of very high purity as shown, when a solid, by high melting point, good odor and a white crystalline appearance. A relatively small amount of olefin polymer is formed. The catalyst separates from the reaction mixture in substantial part at the end of the reaction and may be recovered and reused as the catalyst in a second alkylation reaction. Also any residual catalyst in the reaction mixture is easily removable.

In carrying out the process of my invention the tetraphosphoric acid is customarily first mixed with the phenol to be alkylated. The tetraphosphoric acid used according to my invention has the formula $H_6P_4O_{13}$ corresponding to a $P_2O_5$ content of about 82 to 84 per cent and is a clear viscous liquid having a viscosity of about 2000 S. U. S. at 80° C. and a specific gravity at 20° C. of about 2.060. It is substantially soluble in most simple phenols and consequently is readily and uniformly distributed throughout the reaction mixture. The tetraphosphoric acid may be used in amounts as low as 2 per cent by weight of the phenol but in most cases I find it advantageous to use about 5 to 10 per cent by weight.

The tetraphosphoric acid catalyst may be used with advantage in the alkylation of phenols either in a batch type or a continuous process. In batch operation the tetraphosphoric acid is customarily first introduced into a reaction vessel with the phenol or phenolic material to be alkylated. The reaction mass is heated to a temperature between about 30 and 70° C. and is vigorously agitated. An olefin containing three or more carbon atoms, advantageously a branched chain olefin such as isobutylene or isoamylene, is then introduced into the agitated mixture. The olefin is customarily introduced in the form of a gas as a substantially pure compound, although a mixture of gases such as a refinery butane cut may be used. Introduction of the olefin into the reaction mass is continued until the reaction is complete. Agitation is then stopped and the mixture is allowed to settle.

In a relatively short time it will be found that the mixture has separated into two layers, one of which contains the alkylated phenol reaction products and the other containing the tetraphosphoric acid catalyst. The degree of separation of the reaction products and catalyst effected by settling varies with the settling time provided. I have found that as high as about 90 per cent of the original tetraphosphoric acid catalyst, sometimes more, can be separated in this way. The separated layers may be recovered by any usual means. The recovered tetraphosphoric acid catalyst may then be used for the alkylation of further quantities of phenols and the alkylated phenol reaction products may be treated for the isolation of individual alkylated phenols.

The individual alkylated phenols are customarily recovered by fractionating the reaction products after washing and neutralizing them to remove any traces of residual acid which may remain in them. The amount of acid remaining in the alkylated phenol reaction products after stratification and separation of the tetraphosphoric acid is relatively small and may be readily removed for example by neutralization with a 5 per cent caustic soda solution and washing with water, without excessive loss of unalkylated or partially alkylated phenolic components of the reaction mixture.

The process of my invention may be carried out in continuous operation, for example, in a typical countercurrent flow in which a mixture containing a phenol and tetraphosphoric acid is caused to flow downward through a packed reaction tower countercurrent to an upward flow of olefin gas such as one containing isobutylene. The reaction products may be taken off at the bottom of the reaction tower to a settling chamber where they are allowed to stratify and the alkylated phenol fraction is separated from the tetraphosphoric acid catalyst fraction. The catalyst may then be recycled to the reaction tower where it is mixed with a further quantity of a phenol and used in the production of more alkylated phenol, while the alkylated phenol reaction products are treated by washing and fractionation for the isolation of individual alkyl phenols.

The method of this invention can be applied in the alkylation of substantially any phenolic material but I have found it particularly advantageous in the alkylation of simple monohydroxy phenols such as phenol itself, cresols, xylenols and ethyl phenols and mixtures of such simple phenols such as cresylic acid.

The following specific examples will serve to illustrate the advantages of this invention and how it may be carried into effect.

*Example 1.*—Para-cresol was treated in a batch operation with gaseous isobutylene at a temperature of 40° C. in the presence of about 5 per cent by weight of tetraphosphoric acid. The isobutylene was introduced into a mixture of the para-cresol and tetraphosphoric acid for a period of about 8½ hours. Toward the end of the reaction it was noted that the catalyst tended to separate out of the reaction mixture. After completion of the reaction the mixture was allowed to settle and stratify into two layers, one containing the alkylated phenol products and the other containing the tetraphosphoric acid catalyst. These layers were separated and the alkylated phenol fraction was washed with 5 per cent sodium hydroxide solution and water until neutral. When the washed alkylate was allowed to stand, crystals of 2,6-di-tertiary-butyl-4-methyl phenol having a melting point of 68° C. settled out. The melting point of pure 2,6-di-tertiary-butyl-4-methyl phenol is 70° C. The yield was about 46 per cent of theoretical. The appearance, odor and melting point of the crystals thus obtained were considerably better than is customarily obtained in crude alkylation products from conventional catalysts. The tetraphosphoric acid which was used as a catalyst in the alkylation of a second batch of para-cresol with isobutylene in the same manner. In this case the catalyst seemed to be even more active than the fresh tetraphosphoric acid although the product did not appear to be quite as pure as that obtained in the first alkylation. However, upon recrystallization from ligroin, crystals of 2,6-di-tertiary-butyl-4-methyl phenol having a melting point of 69° C. were obtained.

*Example 2.*—A mixture of meta-cresol and 5 per cent by weight of tetraphosphoric acid was agitated and heated at a temperature of 60 to 66° C. Isobutylene was introduced into the mixture until approximately an equimolar amount with the meta-cresol had been absorbed. The reaction mixture was then cooled and stratified into an upper layer containing the alkylate and a lower layer containing the tetraphosphoric acid. The layers were separated and the alkylate was diluted with ether and washed with dilute alkali and water until neutral. It was then dried over sodium sulfate and the solvent was distilled off. The reaction products were then fractionated at a reflux ratio of 5 : 1. The tertiary butyl metacresol fraction boiling at 149° C. at 49 millimeters amounted to 72.5 per cent of the theoretical yield based on the original meta-cresol. A minor amount of unbutylated meta-cresol and dibutylated meta-cresol were also recovered.

While my invention has been described herein with particular reference to certain specific embodiments thereof, it is not intended that the invention shall be limited to the details of such embodiments except as hereinafter defined in the appended claims.

What I claim is:

1. An improved process for the alkylation of mono-hydric phenols with olefins comprising treating a mono-hydric phenol in the presence of a catalytic amount of tetraphosphoric acid with an olefin containing at least three carbon atoms at a temperature between 30 and 70° C.

2. An improved process for the alkylation of mono-hydric phenols with olefins comprising treating a mixture consisting essentially of at least one mono-hydric phenol and tetraphosphoric acid in an amount corresponding to at least about 2 per cent by weight of said mono-hydric phenol with an olefin containing at least three carbon atoms at a temperature between 30 and 70° C. and separating the alkylated mono-hydric phenol reaction products from the tetraphosphoric acid.

3. An improved process for the alkylation of mono-hydric phenols with olefins comprising treating a mixture consisting essentially of at least one mono-hydric phenol and tetraphosphoric acid in an amount corresponding to 5 to 10 per cent by weight of said mono-hydric phenol with an olefin containing at least three carbon atoms at a temperature of 30 to 70° C. and separating the alkylated mono-hydric phenol reaction products from the tetraphosphoric acid catalyst.

4. An improved process for the alkylation of mono-hydric phenols with olefins comprising treating a mixture consisting essentially of at least one mono-hydric phenol and a catalytic amount of tetraphosphoric acid with an olefin selected from the group consisting of propylene and the branched chain olefins at a temperature between 30 and 70° C.

5. An improved process for the alkylation of mono-hydric phenols with olefins comprising treating a mixture consisting essentially of at least one mono-hydric phenol and a catalytic amount of tetraphosphoric acid with an olefin selected from the group consisting of propylene and the branched chain olefins at a temperature between 30 and 70° C. and separating the alkylated mono-hydric phenol products from the tetraphosphoric acid catalyst and alkylating a further quantity of mono-hydric phenol in the presence of the tetraphosphoric acid catalyst thus recovered.

6. An improved process for the alkylation of mono-hydric phenols with a branched chain olefin comprising dissolving tetraphosphoric acid in catalytic amounts in mono-hydric phenol and treating this solution at a temperature of 30 to 70° C. with a branched chain olefin containing at least three carbon atoms.

7. An improved process for the preparation of 2,6-di-tertiary-butyl-4-methyl phenol comprising treating a mixture consisting of para-cresol and a catalytic amount of tetraphosphoric acid with isobutylene at a temperature between 30 and 70° C. to form a reaction mass and separating 2,6-di-tertiary-butyl-4-methyl phenol from said reaction mass.

8. An improved process for the preparation of tertiary butyl meta-cresol comprising treating a mixture consisting of meta-cresol and a catalytic amount of tetraphosphoric acid with isobutylene at a temperature between 30 and 70° C. to form a reaction mass and separating tertiary butyl meta-cresol from said reaction mass.

GORDON H. STILLSON.

REFERENCES CITED

The following references are of record in the file of this patent:

UNITED STATES PATENTS

| Number | Name | Date |
|---|---|---|
| 2,046,900 | Ipatieff | July 7, 1936 |
| 2,415,069 | Arvin | Feb. 4, 1947 |

Disclaimer 2,428,745.—*Gordon H. Stillson*, Oakmont, Pa. ALKYLATION OF PHENOLS. Patent dated Oct. 7, 1947. Disclaimer filed Dec. 30, 1948, by the assignee, *Gulf Research & Development Company*.

Hereby enters this disclaimer to claims 1, 2, 3, 4 and 6 of said patent.

[*Official Gazette February 8, 1949.*]

isobutylene at a temperature between 30 and 70° C. to form a reaction mass and separating 2,6-di-tertiary-butyl-4-methyl phenol from said reaction mass.

8. An improved process for the preparation of tertiary butyl meta-cresol comprising treating a mixture consisting of meta-cresol and a catalytic amount of tetraphosphoric acid with isobutylene at a temperature between 30 and 70° C. to form a reaction mass and separating tertiary butyl meta-cresol from said reaction mass.

GORDON H. STILLSON.

REFERENCES CITED

The following references are of record in the file of this patent:

UNITED STATES PATENTS

| Number | Name | Date |
| --- | --- | --- |
| 2,046,900 | Ipatieff | July 7, 1936 |
| 2,415,069 | Arvin | Feb. 4, 1947 |

Disclaimer 2,428,745.—*Gordon H. Stillson*, Oakmont, Pa. ALKYLATION OF PHENOLS. Patent dated Oct. 7, 1947. Disclaimer filed Dec. 30, 1948, by the assignee, *Gulf Research & Development Company*.

Hereby enters this disclaimer to claims 1, 2, 3, 4 and 6 of said patent.

[*Official Gazette February 8, 1949.*]